US012781906B2

(12) United States Patent
Kolacz

(10) Patent No.: US 12,781,906 B2
(45) Date of Patent: Nov. 3, 2026

(54) CLAMP FOR A FLEXIBLE HOSE OR TUBE

(71) Applicant: TASK FORCE TIPS, LLC, Valparaiso, IN (US)

(72) Inventor: David J. Kolacz, Plymouth, IN (US)

(73) Assignee: TASK FORCE TIPS, LLC, Valparaiso, IN (US)

( * ) Notice: Subject to any disclaimer, the term of this patent is extended or adjusted under 35 U.S.C. 154(b) by 387 days.

(21) Appl. No.: 18/284,364

(22) PCT Filed: Apr. 28, 2022

(86) PCT No.: PCT/US2022/026625
§ 371 (c)(1),
(2) Date: Sep. 27, 2023

(87) PCT Pub. No.: WO2022/235471
PCT Pub. Date: Nov. 10, 2022

(65) Prior Publication Data
US 2024/0159345 A1 May 16, 2024

Related U.S. Application Data

(60) Provisional application No. 63/183,304, filed on May 3, 2021.

(51) Int. Cl.
*F16L 55/10* (2006.01)
*B25B 7/12* (2006.01)

(52) U.S. Cl.
CPC .............. *F16L 55/10* (2013.01); *B25B 7/123* (2013.01)

(58) Field of Classification Search
CPC ........... B25B 7/12; B25B 7/123; B25B 13/28; B25B 5/12; B25B 1/14; F16L 55/10; B30B 9/3052
(Continued)

(56) References Cited

U.S. PATENT DOCUMENTS 798,827 A * 9/1905 Pirsch ................ F15B 13/0857 251/9
4,582,292 A * 4/1986 Glotzback .............. A62C 33/04 251/9
(Continued)

FOREIGN PATENT DOCUMENTS

CN 101850441 A 10/2010
CN 203034120 U 7/2013

OTHER PUBLICATIONS

International Application No. PCT/US2022/026625, International Search Report and Written Opinion, mailed Jul. 29, 2022.

*Primary Examiner* — Hadi Shakeri
(74) *Attorney, Agent, or Firm* — Vedder Price P.C.

(57) ABSTRACT

A clamp that is used for clamping a flexible tube or hose has two primary pieces that are hinged together at one end and have handle sections on the other end. Two linking pieces that are hinged together at one end have opposite ends that are hinged to intermediate hinge points on the primary pieces. Clamping surfaces on one of the primary pieces and on one of the linking pieces open in the direction of the handles. When rotating to the closed position, the intermediate hinge point on one of the primary arms moves from one side of a line that runs between the point where the primary pieces are hinged and the point where the linking pieces are hinged to the other side of that line, providing a locking action.

10 Claims, 15 Drawing Sheets

(58) Field of Classification Search
USPC ....... 81/422, 381, 128, 361; 251/9; 269/228, 269/238, 201
See application file for complete search history.

(56) References Cited

U.S. PATENT DOCUMENTS

| | | | | |
|---|---|---|---|---|
| 5,152,497 | A * | 10/1992 | Bissell | F16K 7/063 81/422 |
| 5,159,757 | A | 11/1992 | Weid et al. | |
| 5,511,314 | A | 4/1996 | Huang | |
| 5,961,109 | A * | 10/1999 | Dykstra | B25B 5/08 269/236 |
| 6,543,344 | B1 * | 4/2003 | Settele | A47J 19/06 100/243 |
| 7,434,497 | B2 | 10/2008 | Caravello | |
| 2010/0236080 | A1 | 9/2010 | Huang | |

* cited by examiner

CLAMP FOR A FLEXIBLE HOSE OR TUBE

BACKGROUND OF THE INVENTION

The present invention relates generally to clamps for firefighting hoses but can be applied to any flexible tube that needs temporary flow restriction.

Clamps for firefighting hoses have been used for many years. In forestry settings, long lengths of hose are often needed, and a clamp permits a firefighter at the downstream end of a long hose to temporarily stop the flow of fluid through the hose so that a new length of hose can be added without the need to return to the upstream end of the hose or signal a firefighter there. Many of the older clamps used for this purpose were large, and could not be easily carried by a firefighter. The bulk limited their usefulness.

One of the two styles of clamps most common today is manufactured by S&H Products LLC, and is referred to as an S&H style clamp. Products of this general style have three hinged metal bars and three hinge points. Two of the bars are handle pieces, and are hinged together at one end. One of the handle pieces has a second hinge point to which one end of the third metal bar is hinged. The other handle piece has a metal gate or drawing loop hinged to it at the third hinge point.

To clamp a hose, the two handle pieces are spread apart and the third metal bar is rotated away from the handle piece to which it is hinged. The hose is inserted in the opened space. The drawing loop is then used to close the opening, and is secured to the end of the third bar. The handle pieces are then drawn together, causing the first and third hinge points to each act as a fulcrum about which the two surfaces surrounding the hose are driven together.

In some products, the drawing loop is hinged to the third bar, and secured to the remote handle, but the effect is exactly the same.

The Wildland Hose Clamp sold by C&S is only slightly different in detail, but works on the same general principles and provides similar results.

The other clamp in most common use today is arranged like a pair of pliers. That style . . . of product replaces the drawing loop with a fourth metal bar. Two of the bars again serve as handles. But instead of being hinged at an end of each handle, those two pieces are hinged together toward the middle of those handle pieces. Again, a third bar piece is hinged to one of the two handle pieces at a second hinge point that, in this case, is near the first hinge point where the two handle pieces are connected. A fourth bar is hinged at one end to an intermediate point on the third bar, and at the other end to a point on the remote handle piece. That fourth hinge point is positioned so that the first hinge point (where the two handle pieces are connected) lies between the fourth hinge point and the extending portion of that bar. (The extending portion is the only portion of that piece that effectively serves as a handle: pressing that portion of that piece toward the other handle closes the jaws, but pressing the portion of that piece on the other side of the first hinge point instead opens the jaws.)

One drawback of an S&H style clamp is that manipulation of the gate or drawing loop is cumbersome. Also, because of the weight of the hose, it is typically most convenient to press the handles together from above the hose rather than from below it. When operating an S&H style clamp, gravity may urge the hose toward the gate. That can lead to unintended pinching, which can damage the hose.

The pliers style of clamp has no gate, eliminating the pinching problem but creating a new problem of ensuring that the hose remains within the jaws while a firefighter presses the handles together from above. In addition, the pliers arrangement limits the effective length of the arms, and thus typically results in a bulkier product that offers significantly less mechanical advantage than a product in the S&H style.

BRIEF SUMMARY

The applicants have developed a new flexible tube/hose clamp that requires no gate or drawing loop, provides better mechanical advantage than a pliers-style clamp, and is arranged to help ensure that the flexible tube/hose stays in place while the handles are being closed.

The new flexible tube/hose clamp has two primary pieces that are hinged together at a primary hinge. Each of those pieces has an extending arm and an intermediate hinge point that is positioned between the primary hinge point and the extending arm on that primary piece.

The new clamp has two linking pieces that are hinged together with a secondary hinge at one end and, at their opposite ends, are hinged to the primary pieces at intermediate hinges.

On spreading the extending arms of the primary pieces, an upward facing opening is created between one of the primary pieces and the linking piece attached to it. The flexible tube/hose can easily be dropped into this space, where gravity tends to hold it in position with no need to manipulate a securing gate. Once the flexible tube/hose is in place, the mechanical advantage provided by this new arrangement can apply a clamping force that is significantly higher than the force provided by comparably-sized pliers-style clamps.

The various pieces and hinge points are preferably sized and configured so that when the clamp is being closed on a flexible tube/hose positioned between one primary piece and one linking piece, a locking action is achieved. The presence of this locking action can be confirmed by observing the position of the intermediate hinge on the other primary piece with respect to an imaginary line that runs from the primary hinge where the two primary pieces are hinged together to the secondary hinge where the two linking pieces are hinged together. The locking action is obtained when that intermediate hinge moves from a position on the distal side of that imaginary line (i.e., away from the flexible tube/hose and the clamping surfaces) to a proximal side of that line as the arms are closed.

BRIEF DESCRIPTION OF THE DRAWINGS

The invention can be better understood by referring to the accompanying drawings, in which.

DETAILED DESCRIPTION

Figure 1:
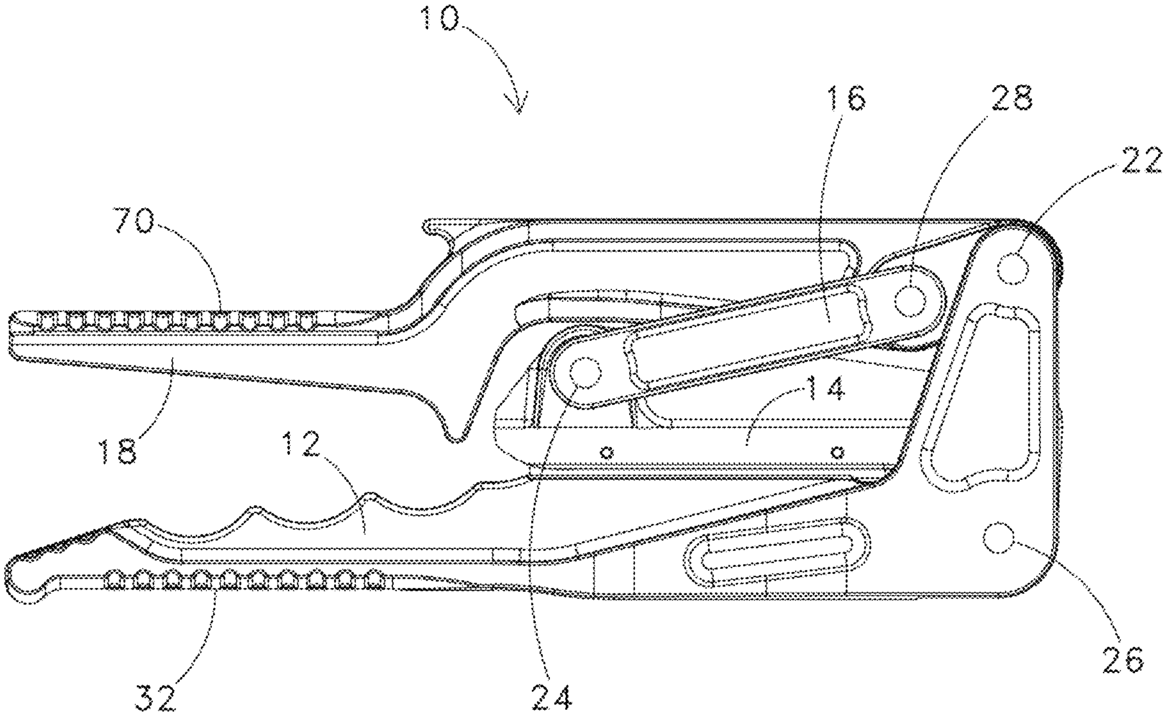
FIG. 1 is a side view of a hose clamp that utilizes the new invention, the clamp being shown in its closed position.
Figure 2:
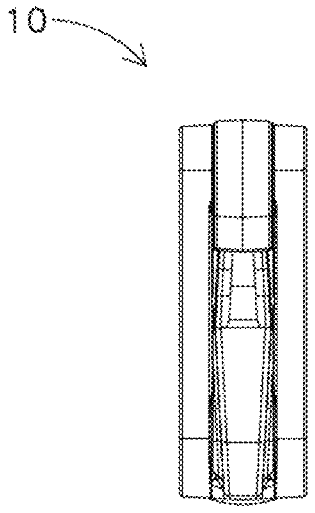
FIG. 2 is an end view of that clamp.

The clamp 10 seen in the figures has four primary pieces: a proximal primary piece 12, a clamping linking piece 14, a secondary linking piece 16, and a distal primary piece 18. Conventional pins can be used to link the pieces with four hinges: a primary hinge 22, a secondary hinge 24, a first intermediate hinge 26, and a second intermediate hinge 28. Each piece will be described in detail below. Unlike the locking gate on an S&H style clamp, the hinges remain connected together throughout the process of loading, clamping, and unloading a hose, eliminating the need for an operator to open or close the connections.

The Proximal Primary Piece

Figure 7:
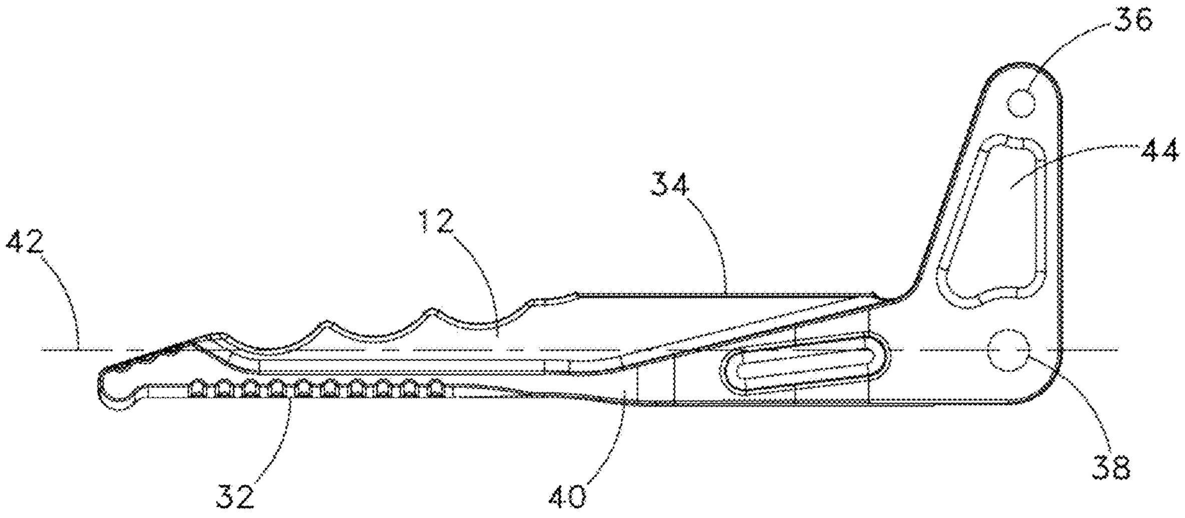
FIGS. 7-10 are plan views of the four main pieces of the clamp.
Figure 11:
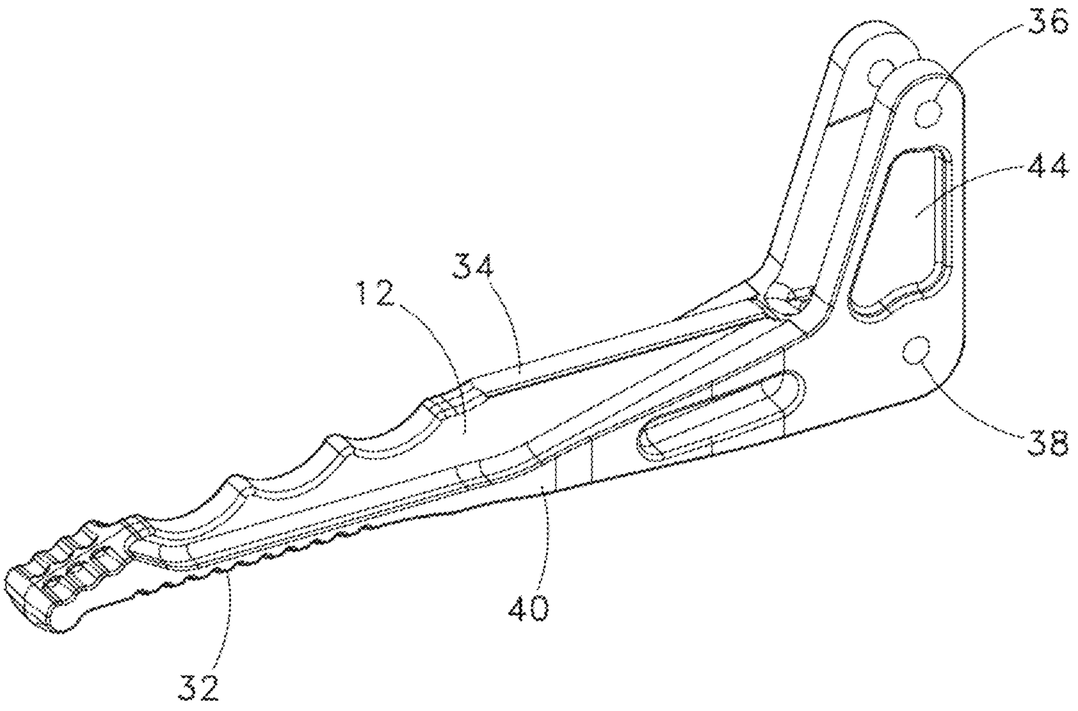
FIGS. 11-14 are isometric views of those pieces.

As best seen in FIGS. 7 and 11, the proximal primary piece 12 is a structural element that has an extending handle section 32, a squeezing surface 34, a terminal hinge point in the form of an aperture 36, and an intermediate hinge point in the form of an aperture 38.

The handle section 32 is intended to be gripped by a user when squeezing a flexible tube/hose. It may be shaped or configured accordingly.

The illustrated squeezing surface 34 is used for squeezing the flexible tube/hose. For illustrative purposes, a 1½" single jacket forestry hose typically used in fighting forest fires has been contemplated. That type of hose has a nominal inside diameter of 1.5" and typically has an outside diameter of approximately 1.65". It is typically approximately 2.5" wide when flat. The squeezing surface is preferably at least as long as the width of the firefighting hose when the hose is in a collapsed state, and may be surfaced accordingly.

The terminal hinge point 36 forms part of the primary hinge 22, and the intermediate hinge point 38 forms part of the first intermediate hinge 26. Structurally, it is important that the intermediate hinge point 38 be positioned laterally between the squeezing surface 34 and the terminal hinge point 36, and that the squeezing surface be positioned between the intermediate hinge point and the outer end of the handle section 32. Portions of the squeezing surface can extend out into the handle section.

An arm 40 of the proximal primary piece 12 carries the handle section 32 and the squeezing surface 34. The arm is preferably arranged as a relatively straight arm that extends along a handle axis 42 that extends from the intermediate hinge point 38. The arm could, however, be bent.

The terminal hinge point 36 is on a second arm 44 of the proximal primary piece 12 that preferably extends at an angle to the handle axis 42, so that the terminal hinge point is spaced at a distance above the working face of the squeezing surface 34. Increasing this distance lowers internal loads, but increases the overall size of the device. In the illustrated clamp 10, the terminal hinge point is positioned about 2¼" from the line of the squeezing surface.

The Clamping Linking Piece

Figure 8:
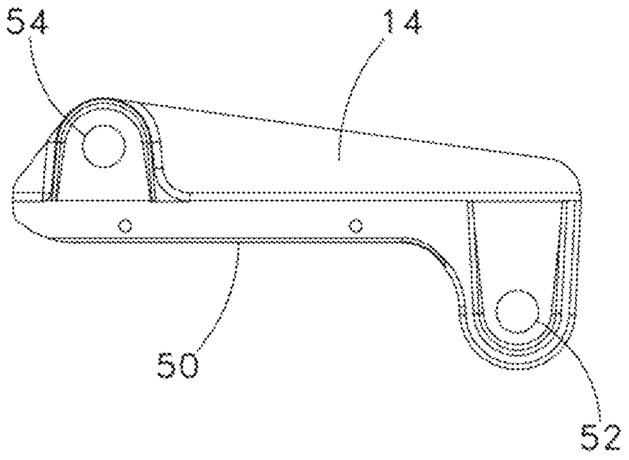
Figure 12:
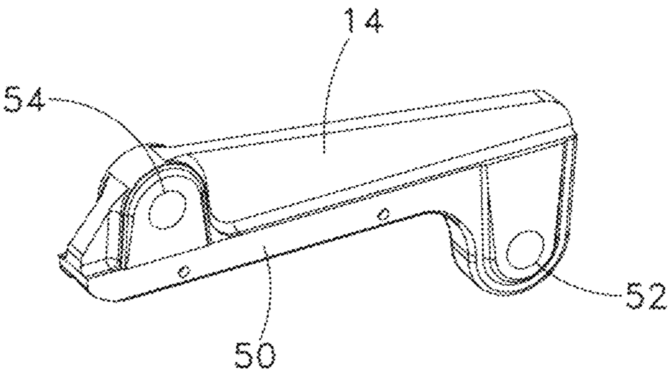

The clamping linking piece 14 (best seen in FIGS. 8 and 12) is a structural element that has a second squeezing surface 50, a first aperture 52 at one end, and a second aperture 54 at the other end.

The second squeezing surface 50 is used for squeezing the flexible tube/hose against the squeezing surface 34 on the proximal primary piece 12. This second squeezing surface is preferably at least at long as the width of the flexible tube/hose when the flexible tube/hose is in a collapsed state.

The first aperture 52 forms part of the first intermediate hinge 26, and the second aperture 54 forms part of the secondary hinge 24. Structurally, it can be valuable for the second squeezing surface 50 to be angled with respect to the axis between these two apertures.

The clamping linking piece 14 is configured so that when the clamp 10 is closed (e.g., FIG. 1), the second squeezing surface 50 presses flat (or essentially flat) against the squeezing surface 34 on the proximal primary piece 12, to clamp shut a flexible tube/hose between those surfaces.

In the disclosed embodiment, the center of second aperture 54 is spaced approximately 1⅛" from the line of the second squeezing surface 50. Other distances could be used, and the distance between the two apertures 52 and 54 along the direction of the second squeezing surface could also be varied.

The Secondary Linking Piece

Figure 9:
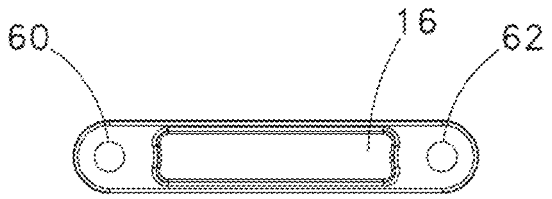
Figure 13:
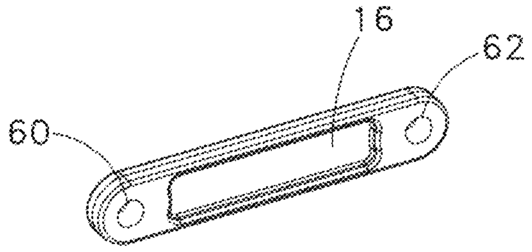

The secondary linking piece 16 (best seen in FIGS. 9 and 13) is a structural element that has a first aperture 60 at one end, and a second aperture 62 at the other end.

The first aperture 60 forms part of the secondary hinge 24, and the second aperture 62 forms part of the second intermediate hinge 28.

Preferably, the secondary linking piece is a simple, straight element. In the disclosed embodiment, the centers of the two apertures 60 and 62 are separated by approximately 3½". The distance between the apertures can vary, and will affect the gripping force that is applied on the squeezing surfaces 34 and 50 when the clamp 10 is closed.

The Distal Primary Piece

Figure 10:
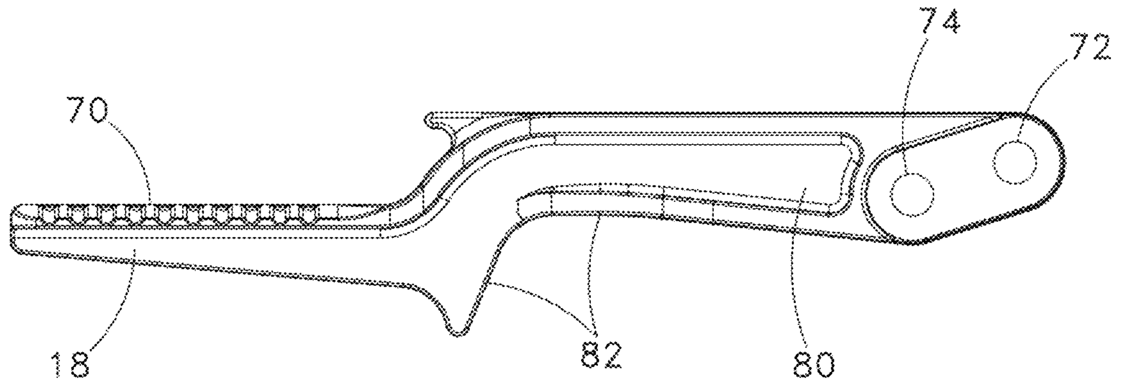
Figure 14:
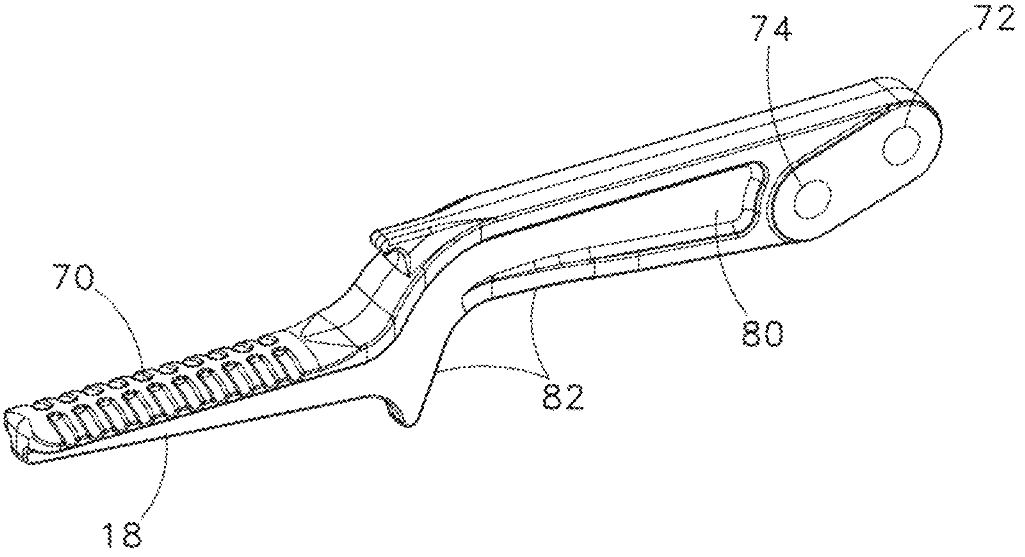

The distal primary piece 18 (best seen in FIGS. 10 and 14) is a structural element that has a handle section 70, a terminal hinge point in the form of aperture 72, and an intermediate hinge point in the form of an aperture 74.

The handle section 70 is intended to be gripped by a user when squeezing a flexible tube/hose. Like the other handle section 32, it may be shaped or configured accordingly.

The terminal hinge point 72 forms part of the primary hinge 22, and the intermediate hinge point 74 forms part of the second intermediate hinge 28. Structurally, it is important that the second intermediate hinge point 74 be positioned laterally between the handle section 70 and the terminal hinge point 72.

An arm 80 of the distal primary piece 18 that carries the handle section 70 is shown here with a recessed surface 82 that accommodates the clamping linking piece 16 when the clamp 10 is closed, as seen in FIG. 1.

Preferably, the two hinge points 72 and 74 are positioned so that when the clamp 10 is closed (FIG. 1), the intermediate hinge point 74 (and second intermediate hinge 28) is not co-linear with the primary and secondary hinges 22 and 24, but is instead offset toward the squeezing surfaces 34 and 50. In the disclosed embodiment, these three apertures form an angle of approximately 175 degrees when the clamp is fully closed. The angle can be varied depending upon tolerances and the degree of locking desired.

In the disclosed embodiment, the two hinge points 72 and 74 on the distal primary piece 18 are positioned about 1⅛" apart. This relatively close spacing helps to increase the mechanical advantage afforded by the clamp, and can be varied as desired.

Operation

Figure 3:
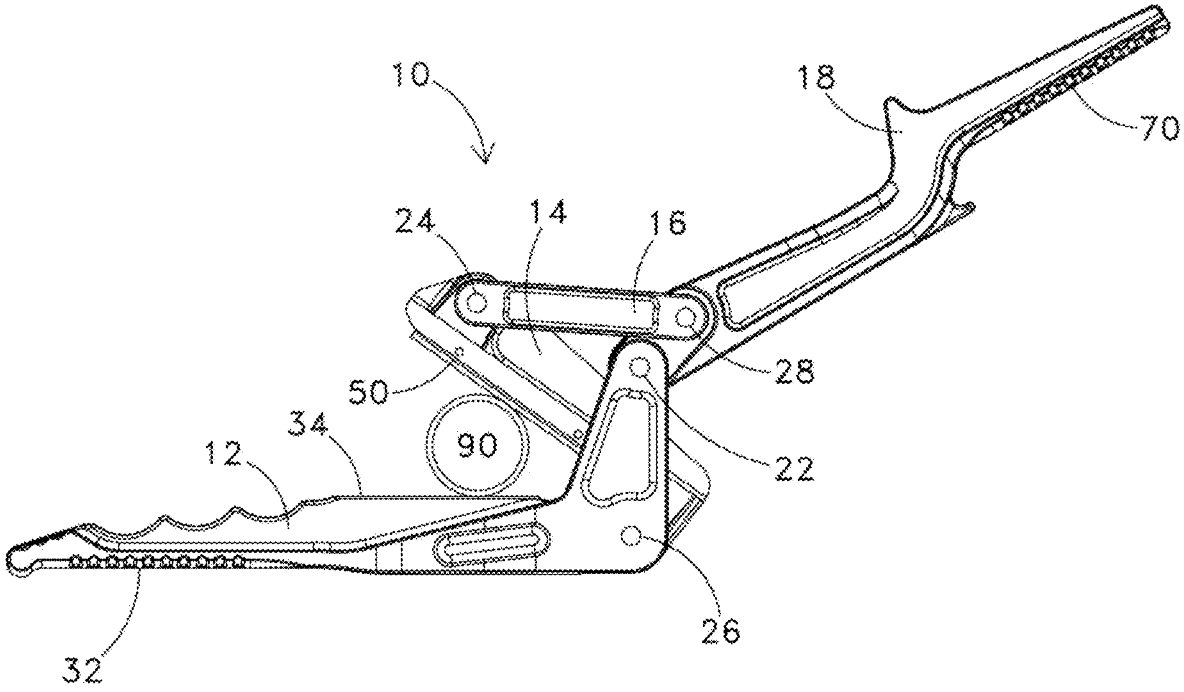
FIG. 3 is a side view of the clamp in an open position, with a flexible tube/hose in place.
Figure 4:
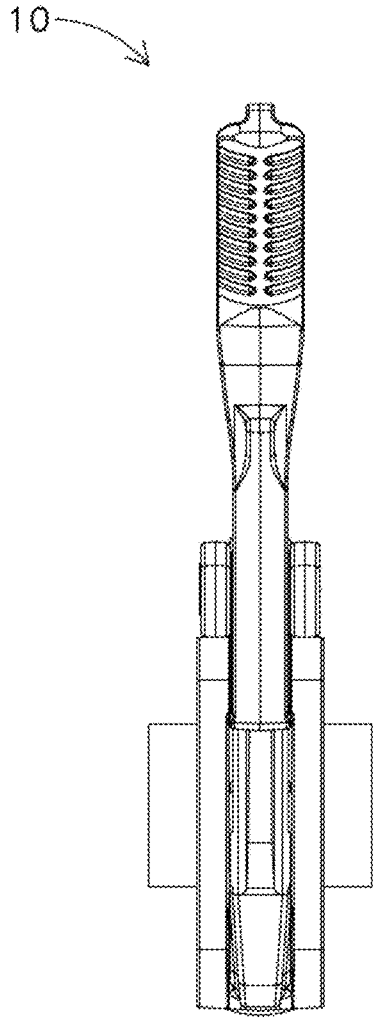
FIG. 4 is an end view of the arrangement seen in FIG. 3.
Figure 5:
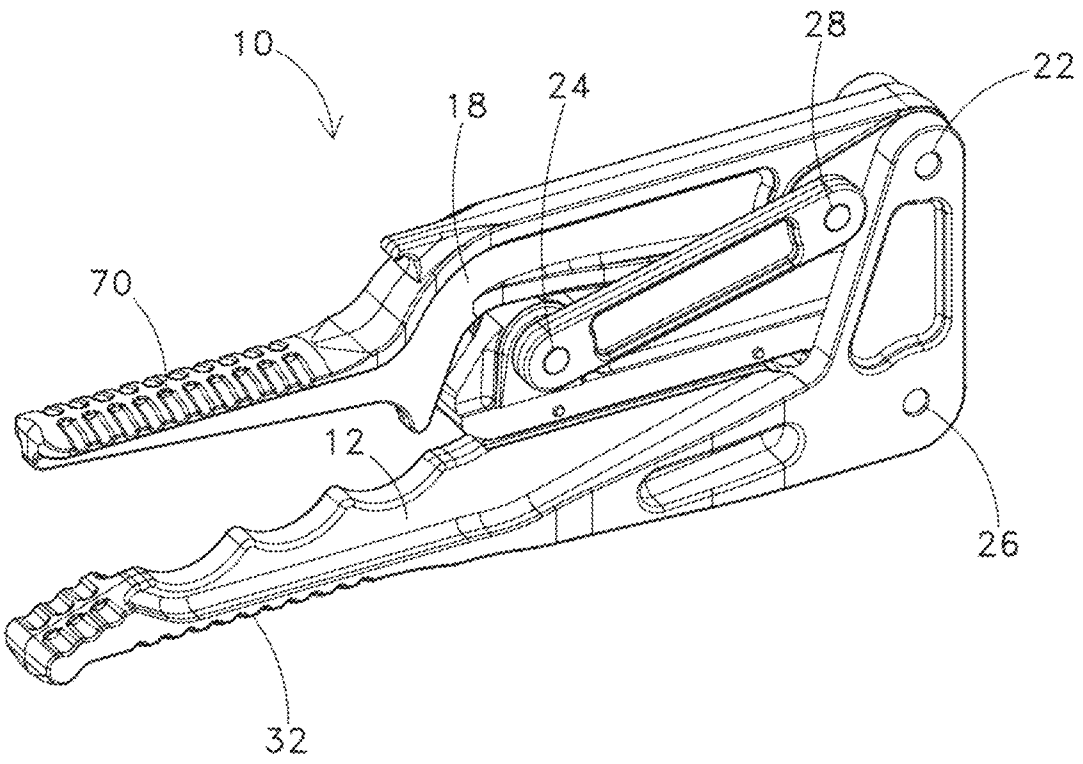
FIG. 5 is an isometric view of the clamp in the closed position.
Figure 6:
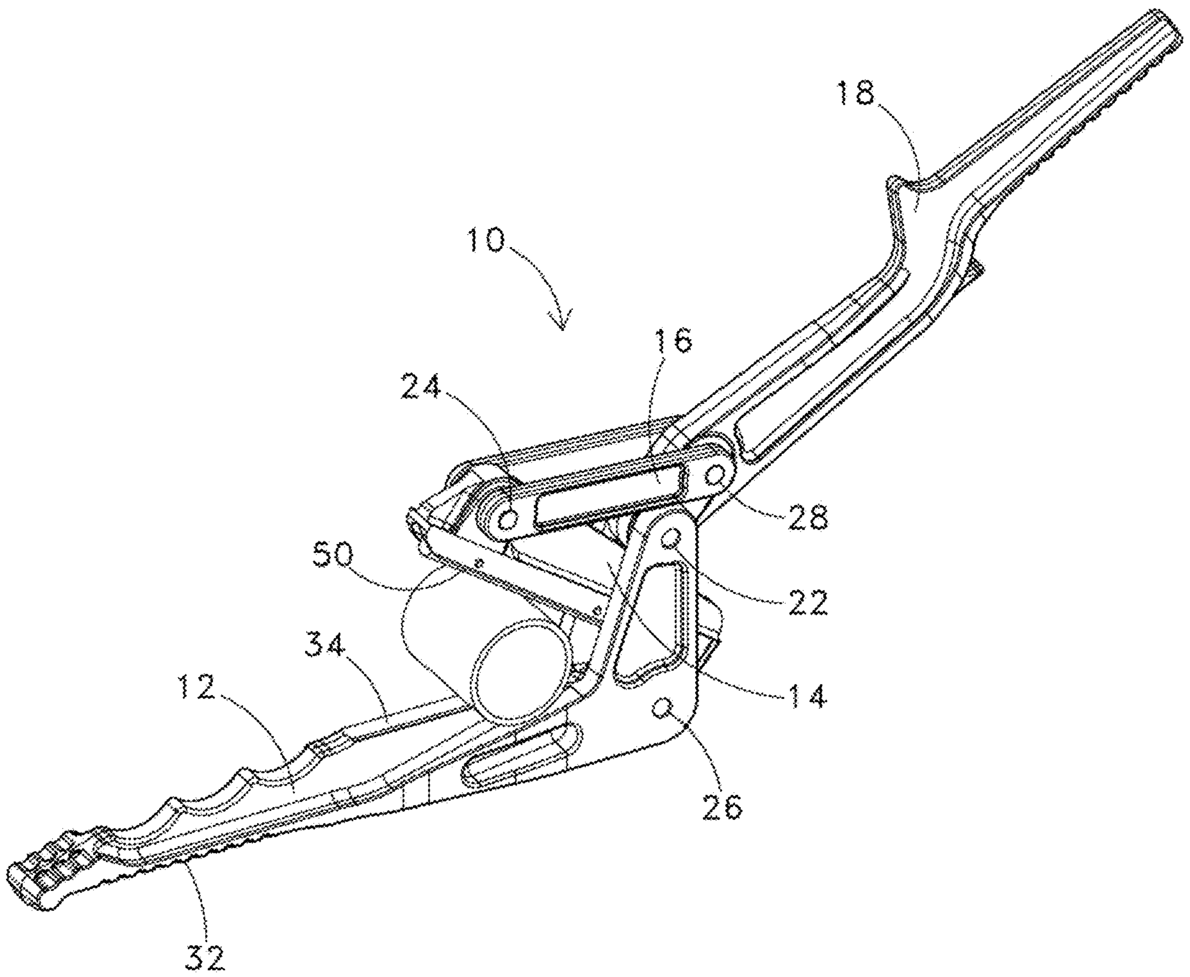
FIG. 6 is an isometric view of the clamp in the open position.

In its closed position (FIGS. 1 and 5), the disclosed clamp 10 is only about 11" long in its longest dimension. The clamp can be opened to an open position (FIGS. 3 and 6) in which distal ends of the squeezing surfaces 34 and 50 are spaced at a distance that exceeds one-and-a-half times the diameter of the typical hose used by forestry firefighters. In this position, the second intermediate hinge 28 lies on a distal side of the imaginary line between the primary and secondary hinges 22 and 24.

In contrast to the case with pliers-style clamps, the squeezing surfaces 34 and 50 of the new clamp open in the same general direction as the handle sections 32 and 70: i.e., opening toward the end of the handle sections rather than away from the end of the handle sections. As a result, when the operator holds the handles up (in order to most conveniently hold the clamp while squeezing), the force of gravity urges the hose into the squeezing surfaces, rather than away from those surfaces, as occurs with a pliers-style clamp.

Figure 15:
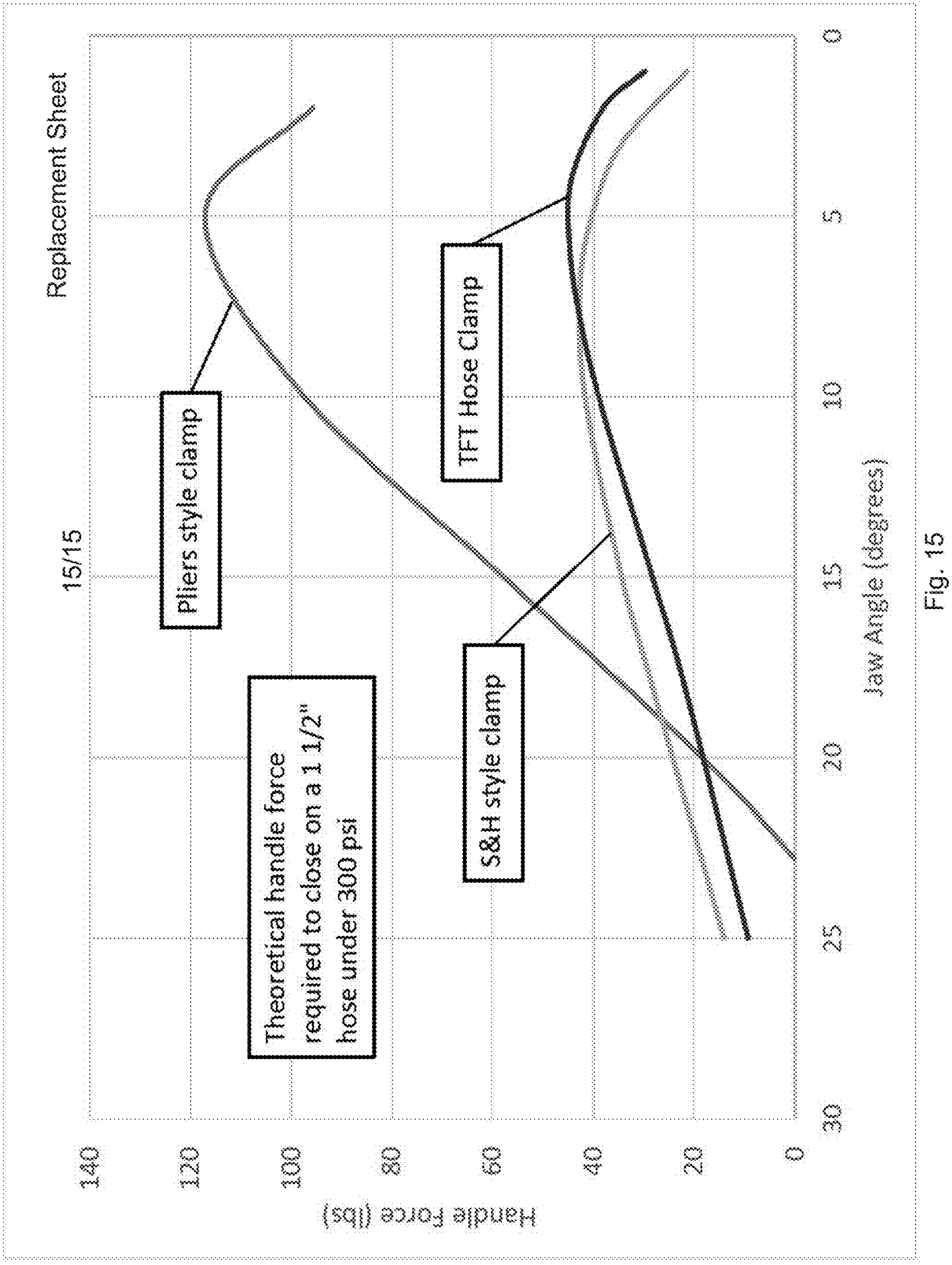
FIG. 15 is a graph illustrating handle force vs jaw angle.

In addition, the handles formed by the handle sections 32 and 70 in this new arrangement serve as a second-degree lever, rather than as a third-degree lever, providing a greater mechanical advantage in less space than the handles of a pliers-style arrangement. A comparison of the clamping forces required to close the three types of clamps on a typical 1½" hose carrying 300 psi is shown in FIG. 15.

As the handle sections 32, 70 come near their completely closed position, the secondary intermediate hinge 28 crosses the imaginary line between the primary and secondary hinges 22 and 24. Mechanically, the new position provides a locking action that helps to keep the clamp closed.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A clamp for clamping a flexible tube or hose, the clamp comprising:

a first primary piece and a second primary piece that are hinged together at a primary hinge, wherein the first primary piece includes a first handle section disposed opposite the primary hinge, a first squeezing surface disposed between the primary hinge and the first handle section, and a first intermediate hinge point disposed opposite the first handle section such that the first squeezing surface is disposed between the first intermediate hinge point and the first handle section, wherein the second primary piece includes a second handle section disposed opposite the primary hinge and an intermediate hinge point disposed between the primary hinge and the second handle section;

a clamping linking piece including a first aperture that is hinged to the first intermediate hinge point on the first primary piece, a second aperture that is spaced from the first aperture, and a second squeezing surface disposed between the first aperture and the second aperture;

a secondary linking piece including a first aperture that that is hinged to the second intermediate hinge point on the second primary piece, and a second aperture that is spaced from the first aperture on that linking piece;

wherein the clamping linking piece and the secondary linking piece are hinged together at a secondary hinge that connects the second aperture of the clamping linking piece and the second aperture of the secondary linking piece; and wherein the first squeezing and the second squeezing surface are configured to squeeze the flexible tube or hose so as to effectively prevent or reduce the flow of fluid through the flexible tube or hose.

2. The clamp as recited in claim 1, wherein the first intermediate hinge point on the first primary piece is disposed laterally offset from the first squeezing surface and the primary hinge is disposed laterally offset from the first squeezing surface oppositely from the first intermediate hinge point such that the first squeezing surface is positioned laterally between the first intermediate hinge point and the primary hinge.

3. The clamp as recited in claim 1, wherein the first primary piece is configured to hingedly rotate between and define a) a closed position in which the first and second squeezing surfaces are disposed adjacently so as to facilitate squeezing the flexible tube or hose sufficiently to effectively prevent or significantly reduce the flow of fluid through the flexible tube or hose, and b) an open position wherein distal ends of the first and second squeezing surfaces are spaced at a distance that exceeds one-and-a-half times the diameter of a flexible tube or hose.

4. The clamp as recited in claim 1, wherein the clamp, when disposed in a closed position, is no more than 11" long in its longest dimension.

5. The clamp as recited in claim 1, wherein:

the clamp, when disposed in a closed position, has the second intermediate hinge point on the second primary arm disposed on a proximal side of a line that runs between the primary hinge and the secondary hinge.

6. The clamp as recited in claim 1, wherein:

the first squeezing surface is disposed between the first intermediate aperture and an outer end of the first handle section.

7. The clamp as recited in claim 1, wherein:

the first primary piece has a straight arm that forms the first handle section and includes the first squeezing surface.

8. The clamp as recited in claim 1, wherein the first primary piece has:

a handle axis that extends from the first intermediate hinge point along the first handle section; and an arm that extends at an angle to the handle axis, wherein the second primary piece is hinged at a distance above the first squeezing surface.

9. The clamp as recited in claim 1, wherein:

the second squeezing surface is not collinear with an axis between the first and second apertures of the clamping linking piece.

10. The clamp as recited in claim 1, wherein:

the second primary piece has a recessed surface such that the second handle section is offset from the second intermediate hinge point configured so as to accommodate the secondary linking piece when the clamp is disposed in a closed position.

* * * * *